US005973413A

United States Patent [19]

Walley

[11] Patent Number: 5,973,413

[45] Date of Patent: Oct. 26, 1999

[54] SAFETY OPERATION OF AN ELECTRIC FENCE AT ITS JUNCTION POINTS

[75] Inventor: John Leonard Walley, Hamilton, New Zealand

[73] Assignee: Gallagher Group Limited, Hamilton, New Zealand

[21] Appl. No.: 08/860,312

[22] PCT Filed: Aug. 12, 1996

[86] PCT No.: PCT/NZ96/00081

§ 371 Date: Jan. 28, 1998

§ 102(e) Date: Jan. 28, 1998

[87] PCT Pub. No.: WO97/07655

PCT Pub. Date: Feb. 27, 1997

[30] Foreign Application Priority Data

Aug. 11, 1995 [NZ] New Zealand .......................... 272757

[51] Int. Cl.[6] ...................................................... A01K 3/00

[52] U.S. Cl. .............................................. 307/106; 256/10

[58] Field of Search .................................... 307/106–108, 307/326–328, 141, 141.4, 141.8; 119/220; 256/10; 340/564; 361/232; 324/678, 713

[56] References Cited

U.S. PATENT DOCUMENTS

| | | | |
|---|---|---|---|
| 4,750,451 | 6/1988 | Smith | 119/220 |
| 5,448,968 | 9/1995 | Ostlie | 119/220 |

FOREIGN PATENT DOCUMENTS

| | | |
|---|---|---|
| 502 328 | 7/1979 | Australia . |
| WO 95/18520 | 7/1995 | WIPO . |

*Primary Examiner*—Richard T. Elms
*Attorney, Agent, or Firm*—Darby & Darby

[57] ABSTRACT

A method and apparatus for transmitting energy pulses in a conductive fence system which includes two or more conductive lines (1–4), one or more pulse generators (A–D) capable of transmitting energy pulses along each conductive line, and junction points (5–8) where the conductive lines are in contact or close physical proximity to each other. Operation of the energy pulse generators (A–D) are coordinated to ensure that the effective pulses in the vicinity of a junction point (5–8) are within a predetermined pulse rate and magnitude range.

14 Claims, 2 Drawing Sheets

FIG. I

SAFETY OPERATION OF AN ELECTRIC FENCE AT ITS JUNCTION POINTS

TECHNICAL FIELD

This invention relates to safety operation for a security device.

The security device or system shall be referred to throughout the specification as a system having electric fence energisers operating on an electric fence or fences.

It should however be appreciated that the principles behind the present invention can be applied to the operation of other security systems.

Reference throughout the specification shall also be made to use of the present invention in human security situations, although it should be appreciated that the present invention can be used in relation to any other conductive systems for example in respect of animals as well, in particular with cows on a farm.

BACKGROUND ART

In security systems, it is common to have a number of electric fence energisers operating on different conductive lines which combine to form a perimeter fence. One reason for having a number of energisers rather than just a single energiser is to enable sectorisation. For example, at a particular time one section of the security fence may be live, whereas another section of security fence may for various reasons not be live. A typical reason is that staff may be working in that area. At other times the whole of the fenced area may be live.

Another reason for having a number of energisers is in situations where the total size of the fence is greater than that which a single energiser could adequately power along.

Over the years, safety regulations have been enacted which limit the frequency and magnitude of energy pulses that can be delivered by electric fence energisers. This is to ensure that if a person or animal touches or falls against a fence and for whatever reason remains there, the electrical energy received by that person or animal is unlikely to permanently damage them.

With security systems that have two or more energisers on a security system, a problem can occur whereby at a junction between the conductive lines a person can receive a pulse having a greater magnitude than generated singly by an energiser. That is, with two energisers firing (on average every second) at a junction to both conductive lines can either receive effectively a single double every pulse resulting from the synchronous firing of the energisers, or more likely pulses at a rate less than the recommended one second apart.

The pulses received at a junction point from multiple energies shall now be referred to as an effective pulse.

These are understandably undesirable situations for safety reasons but an inevitable result of using multiple energisers for sectorisation purposes.

One possible solution to this problem is to reduce the energy output of the electric fence energisers. However, this is not an effective solution and at points of the electric fence line subject to the effects of only one energiser firing, the pulse is unlikely to be strong enough to form an effective deterrent and thus defeat the purpose of having a security system.

Another possible solution is to build physical barriers at the junction such that a person is prevented from touching conductors in a manner that would allow them to receive a compound shock. However this creates a point on the perimeter that an intruder may find much easier to cross, and would therefore defeat the purpose of having such a security system. The construction of such barriers also significantly increases the cost of the system.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method of transmitting energy pulses on a conductive system where such a system includes two or more conductive lines, one or more pulse generators capable of transmitting an energy pulse along each conductive line, and junction points where the conductive lines are in close physical proximity to each other, the method characterised by the step of:

a) coordinating the operation of the energy pulse generators to ensure that the effective pulses in the vicinity of a junction point of conductive line are within a predetermined pulse rate and magnitude range.

For ease of reference, the energy pulse generator shall now be referred to as an energiser and the conductive line as being an electric fence.

The method shall be referred to as operating on a security system, although it may apply to other systems as well.

It should be appreciated that references to time periods or pulse rates in this specification are by way of example only and should not be seen as limiting.

In addition the term magnitude may refer to peak voltage, pulse duration, energy, quantity of electricity, peak current, RMS current or to any other parameter which may be used to characterise an electrical wave form. It should be appreciated that pulse characteristics such as magnitude and frequency need not be regular or constant.

Further to this a single energiser may include multiple outputs which can also be coordinated using the present invention. In this situation each of those outputs may be considered to be a separate energiser.

The term junction point does not necessarily mean that the conductive lines are in contact with each other. Instead, in preferred embodiments of the present invention the electric fence energisers operate quite separate conductive lines to each other. The junction is envisaged in most cases to be an electric fence post or some other insulated device to which the conductive lines are connected. In some embodiments the conductive lines may not even connect at a single electric fence post, but the junction shall mean any region whereby a person or animal can simultaneously touch conductive lines connected to separate electric fence energisers.

The terms compound pulse and effective pulse refer to a situation whereby pulses are received from more than one energiser such that a pulse is received that is effectively of greater magnitude than would have been received from a single energiser.

The term compound shock refers to a situation whereby pulses are received from more than one energiser such that a pulse is received that is effectively of greater magnitude than would have been received from a single energiser or such that pulses are received at a rate that is effectively faster than would have received from one energiser.

If the operation of the energisers are coordinated with each other, then the effective pulses on the electric fence can at all times fall within safety regulations or whatever parameters are desired by the operator or designer of the security system.

One coordinated operation of a security system having four energisers may be as follows.

Each of the four energisers may operate a separate perimeter fence, the perimeter fences in this example forming a rectangular enclosure. The first and third energisers may operate perimeter fences forming opposite sides of the rectangle and the second and fourth energisers may operate the other opposing perimeter fences. Thus, the first and the third energisers each have junctions with the second and fourth energisers, but not with each other. Similarly, the second and fourth energisers have junctions with the first and third energisers, but not with each other.

The operation of these energisers in accordance with the present invention may be as follows:

a) The first and third energisers may each emit a pulse of a standard magnitude on their respective conductive lines.

b) The second and fourth energisers then may each emit a pulse on their respective conductive lines of the same magnitude 0.75 seconds after the first and third energiser pulses.

c) The first and third energisers may each then emit another pulse a further 0.75 seconds after the second and fourth energiser pulses.

The pattern above may continue for as long as desired.

As can be seen from the above example, a standard pulse is effectively felt at the junction every 0.75 seconds—just over the usual frequency. However, the individual energisers are only firing pulses 1.5 seconds apart each which is just under the usual frequency on the main conductive line. By coordinating the operation of the energisers, there is no risk of pulses or a greater magnitude being felt or pulses which are too close together, say under 0.3 seconds.

Yet another advantage of coordinating the energisers as described above is that effectively less energy is being used as each energiser is firing at less its normal rate. This is of particular benefit when the energiser is powered from a limited source of energy such as a battery.

Another possible firing pattern is to have all the energisers firing at exactly the same time. This would allow the same pulse frequency to be felt regardless of where or how a person contacted the fence system.

While an example of only four energisers is given, it should be appreciated that the present invention can be used with any number of energisers. For example, a single energiser may include multiple outputs which can all be coordinated with the present invention.

It is envisaged that there are many methods by which the operation of the electric fence energisers can be coordinated with the present invention. Several embodiments of co-ordinating means used to co-ordinate the production of energy pulses are discusses below.

At present, the electronics of timing the pulses of electric fence energisers are not accurate enough to ensure that energisers independently firing in a coordinated pattern will still be doing so over a period of time. Thus, in preferred embodiments of the present invention there is provided means of communication which ensures that the firing of the energisers is coordinated with each other.

In one embodiment, there may be provided a central control system which sends out a synchronisation signal along all the electric fence lines. This signal can be used by the individual energisers to reset their timers. Once the timing of the energisers has been reset, the energisers can operate independently until they receive a further synchronisation signal to reset them.

In other embodiments of the present invention the actual firing of each energiser may be controlled by a central control system. That is, the energiser does not fire until it receives a trigger signal from a central control, rather than having to rely on the energiser's usual timing mechanisms.

In another embodiment of the present invention the there may be no central control system and coordination of the pulses is achieved by direct communication between the energisers. For example, an energiser may fire an initial standard energy pulse. A second energiser may sense this pulse and start a timer within itself. After a predetermined time, the second energiser then fires emitting a second energy pulse, the sensing of which acts to trigger the timing mechanism of the first energiser or another energiser if there are more than two. Thus, a ripple pulse method of control can be achieved.

Energisers may sense the production of energy pulses by various means well known in the art. For example an energiser may include circuitry to monitor the electromagnetic field on a point on a conductive line not connected to the energiser. Alternatively an energiser may include a monitoring device connected to a conductive line which does not receive energy pulses from the energiser, such a monitoring device may be capable of monitoring the voltage level on the conductive line, and hence pulses transmitted along the line.

It should be appreciated the means by which the energisers receive communications for coordination may not necessarily be via the electric fence. In some embodiments the energisers may receive radio transmitted communications or communications via the power supply line or communications through other mediums.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

Figure 1:
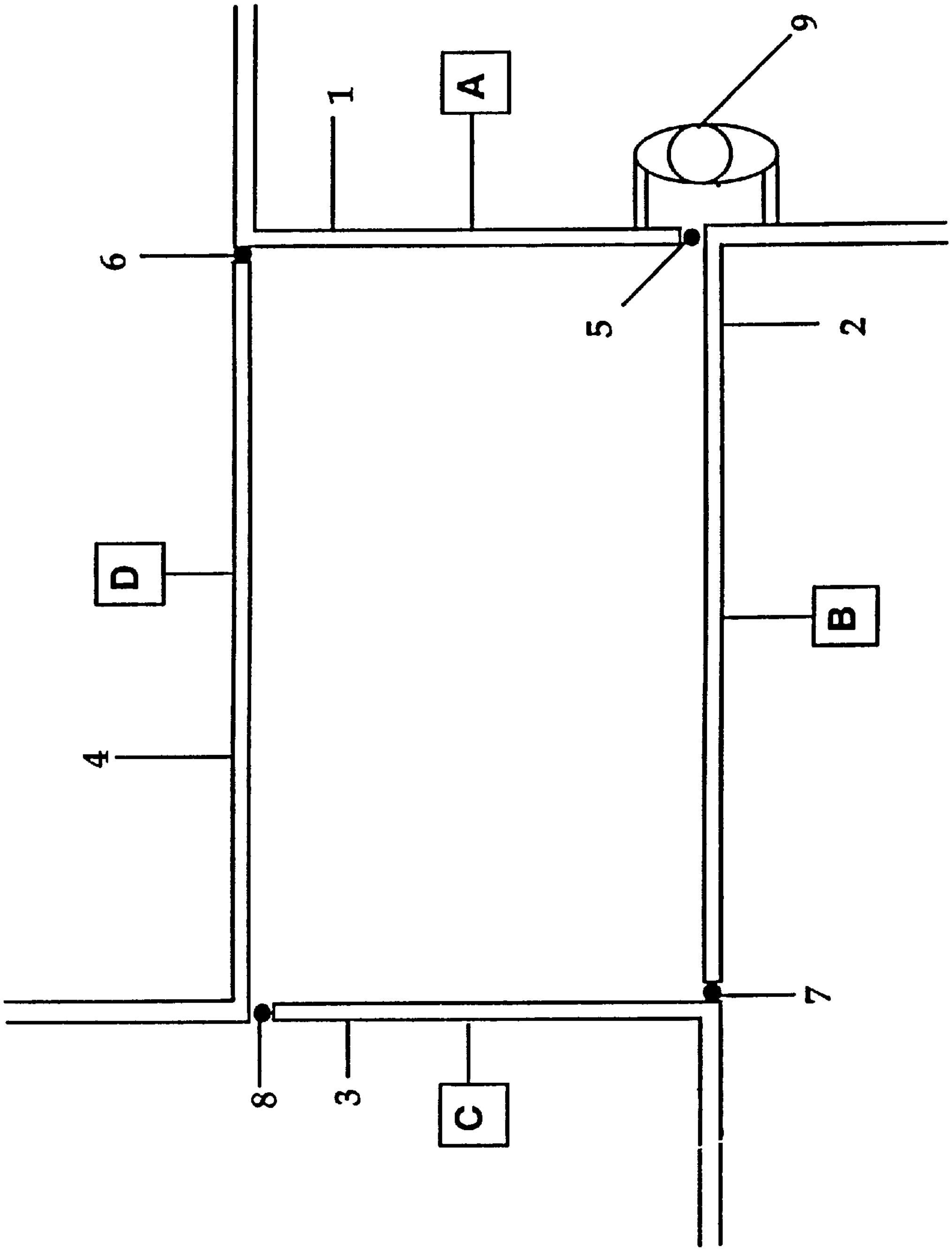
FIG. 1 illustrates a possible security system having two energisers.

The security system illustrated in FIG. 1 comprises of four separate conductive lines 1 to 4 which between them define a square. Each of the conductive lines 1 to 4 have respectively associated with them energisers A to D.

Electric fence line 1 forms a junction 5 with electric fence line 2 and a second junction 6 the electric fence line 4. Likewise, electric fence line 3 forms a junction 7 with the electric fence line 2 and a second junction 8 with electric fence line 4.

If the security system was operating conventionally, each of the energisers A to D would be sending out pulses one second apart, but not coordinated with each other. Thus, a person attempting to climb into the security area at any of the junctions 5 to 8 (which are generally fence posts) is highly likely to receive a greater magnitude shock.

With the present invention, coordinated firing between each of the energisers A to D ensures that there will be the same time differences between all pulses on the fence at the junctions, thus eliminating the chance of a greater magnitude shock.

The table below gives possible firing sequence which would ensure that pulses of a safe and effective magnitude and pulse rate as pulse is received on the main conductive lines 1 to 4 and also at the junctions 5 to 8.

| Seconds | Energisers |
|---|---|
| 0 | A and C |
| 0.75 | B and D |
| 1.5 | A and C |
| 2.25 | B and D |
| 3 | A and C |

Figure 2:
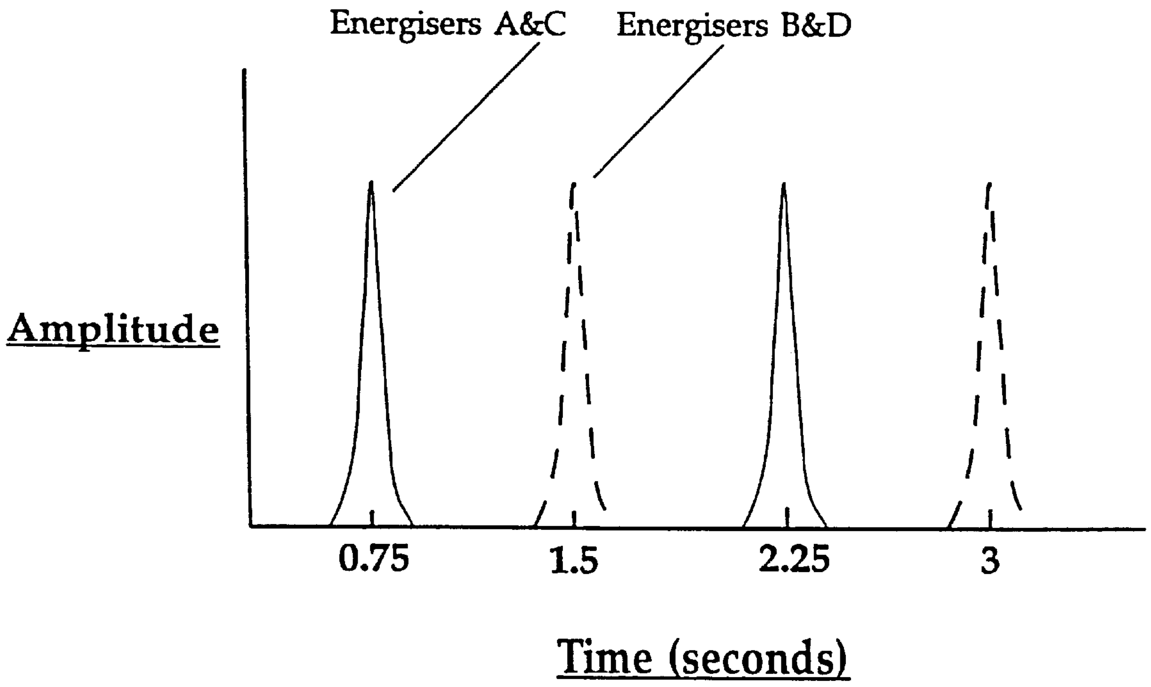
FIG. 2 illustrates in graphical form the operation of the energisers in FIG. 1 in accordance with one aspect of the present invention.

FIG. 2 illustrates this firing sequence.

It should be appreciated that other frequencies can be used by the energisers. If energisers are firing at their normal rate of one second apart, then the pulses felt at the junction will be half a second apart which may be too rapid in some situations. Thus, by firing pulses 1.5 seconds apart effective pulse felt anywhere on the fence line is either just under or just over the standard pulse rate of one second apart.

In some situations, it may be that to meet safety standards pulses cannot be less that one second apart at the junction. Thus a firing sequence may be implemented as below.

| Seconds | Energisers |
|---|---|
| 0 | A and C |
| 1 | B and D |
| 2 | A and C |
| 3 | B and D |
| 4 | A and C |

Aspects of the present invention have been described by way of example only and it should be appreciated that modifications and additions may be made thereto without departing from the scope thereof as defined in the appended claims.

What we claim is:

1. An energy pulse transmission system comprising:
   - a plurality of fence sections, each section including its own respective transmission line, the lines of two or more sections when in close proximity or physical contact forming a junction point;
   - a respective pulse generator for each section to supply electrical pulses to the transmission line of the section; and
   - a controller means to control the operation of said pulse generators of sections whose respective transmission lines form a junction point to maintain effective pulses on the transmission lines in the vicinity of the junction point below a predetermined rate or magnitude range.

2. An energy pulse transmission system as in claim 1 wherein a said pulse generator comprises a plurality of generators, each for producing a pulse output of a different magnitude.

3. An energy pulse transmission system as in claim 1, wherein said controller controls the pulse rate of said generators.

4. An energy pulse transmission system as in claim 1, further comprising synchronizing means for producing synchronization signals to set the timing of the pulses produced by said of pulse generators of sections whose respective transmission lines form a junction point.

5. An energy pulse transmission system as in claim 1, wherein said controller means controls the firing of the pulses of said of pulse generators of sections whose respective transmission lines form a junction point.

6. An energy pulse transmission system as in claim 1, wherein a said pulse generator comprises first and second generators, said second generator including a sensor to sense the production of a pulse by said first generator.

7. An energy pulse transmission system as in claim 6, wherein a said second generator operates to produce a pulse at a predetermined time after the production of the pulse by said first generator.

8. A method of energy pulse transmission for a fence system comprising:
   - providing a plurality of fence sections, each section including its own respective transmission line, the lines of two or more sections when in close proximity or physical contact forming a junction point;
   - supplying electrical energy pulses to the transmission line of each section from a respective pulse generator for the transmission line of each section; and
   - controlling the pulse generators of sections whose respective transmission lines form a junction point to supply effective pulses on the transmission lines in the vicinity of the junction point to be below a predetermined rate or magnitude range.

9. A method as in claim 8 wherein a said pulse generator comprises a plurality of generators, each for producing an output of a different magnitude.

10. A method as in claim 8, wherein said step of controlling comprises controlling the pulse rate of said generators of sections whose respective transmission lines form a junction point.

11. A method as in claim 8, further comprising the step of producing synchronization signals to set the timing of the pulses produced by said pulse generators of sections whose respective transmission lines form a junction point.

12. A method as in claim 11, wherein said controlling step comprises controlling the rate of the pulses of the pulse generators of sections whose respective transmission lines form a junction point.

13. A method as in claim 8, wherein a said pulse generator comprises first and second generators, said second generator including a sensor to sense the production of a pulse by said first generator.

14. A method as in claim 13, wherein a said second generator operates to produce a pulse at a predetermined time after the production of the pulse by said first generator.

* * * * *